United States Patent
Jamjoom et al.

(10) Patent No.: US 10,089,147 B2
(45) Date of Patent: Oct. 2, 2018

(54) HIGH PERFORMANCE COMPUTING AS A SERVICE

(75) Inventors: Hani T. Jamjoom, White Plains, NY (US); Mark E. Podlaseck, Kent, CT (US); Huiming Qu, White Plains, NY (US); Yaoping Ruan, White Plains, NY (US); Denis R. Saure, Santiago (CL); Zon-Yin Shae, South Salem, NY (US); Anshul Sheopuri, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/856,216

(22) Filed: Aug. 13, 2010

(65) Prior Publication Data
US 2012/0042256 A1    Feb. 16, 2012

(51) Int. Cl.
*G06Q 10/00*    (2012.01)
*G06F 9/50*    (2006.01)

(52) U.S. Cl.
CPC ............................... *G06F 9/5011* (2013.01)

(58) Field of Classification Search
None
See application file for complete search history.

(56) References Cited

U.S. PATENT DOCUMENTS

| | | | |
|---|---|---|---|
| 6,434,380 B1 * | 8/2002 | Andersson et al. | 455/406 |
| 7,640,547 B2 * | 12/2009 | Neiman et al. | 718/104 |
| 8,032,622 B2 | 10/2011 | Caspi et al. | |
| 8,204,790 B1 | 6/2012 | Rogers et al. | |
| 8,417,785 B2 | 4/2013 | Fisher et al. | |
| 8,639,650 B1 | 1/2014 | Gill | |
| 2002/0087734 A1 * | 7/2002 | Marshall et al. | 709/310 |
| 2002/0120744 A1 | 8/2002 | Chellis et al. | |
| 2004/0186738 A1 | 9/2004 | Reisman | |
| 2005/0076339 A1 * | 4/2005 | Merril et al. | 718/104 |
| 2005/0131773 A1 * | 6/2005 | Daur et al. | 705/26 |
| 2005/0165921 A1 | 7/2005 | Abadir et al. | |
| 2006/0009987 A1 | 1/2006 | Wang | |

(Continued)

OTHER PUBLICATIONS

Non-Final Office Action dated Sep. 26, 2013 for U.S. Appl. No. 13/599,503.

(Continued)

*Primary Examiner* — Alan S Miller
*Assistant Examiner* — Alan Torrico-Lopez
(74) *Attorney, Agent, or Firm* — Tutunjian & Bitetto, P.C.; Louis J. Percello

(57) ABSTRACT

A scheduling system and method for high-performance computing (HPC) applications includes a network management component stored in physical memory and executed by a processor. The management component is configured to transform HPC resources into a schedulable resource catalog by transforming multi-dimensional HPC resources into a one dimension versus time resource catalog with a dependent graph structure between resources such that HPC resources are enabled to be provisioned into a service environment with predictable provisioning using the resource catalog. A graphical user interface component is coupled to the network management component and configured to provide scheduling visibility to entities and to enable a plurality of different communication modes for scheduling and communication between entities.

25 Claims, 10 Drawing Sheets

(56) References Cited

U.S. PATENT DOCUMENTS

| | | |
|---|---|---|
| 2006/0059565 A1 | 3/2006 | Green et al. |
| 2006/0171315 A1 | 8/2006 | Choi et al. |
| 2006/0293936 A1* | 12/2006 | Breiter et al. .................... 705/8 |
| 2007/0094665 A1* | 4/2007 | Jackson ........................ 718/104 |
| 2007/0106636 A1 | 5/2007 | Sridharan et al. |
| 2007/0198398 A1 | 8/2007 | Rios et al. |
| 2007/0240161 A1 | 10/2007 | Prabhakar et al. |
| 2007/0255835 A1* | 11/2007 | Coppinger et al. .......... 709/226 |
| 2008/0082980 A1 | 4/2008 | Nessland et al. |
| 2008/0104367 A1* | 5/2008 | Blumrich et al. .............. 712/11 |
| 2008/0189718 A1 | 8/2008 | Gulley et al. |
| 2008/0255977 A1 | 10/2008 | Altberg et al. |
| 2009/0030927 A1 | 1/2009 | Cases et al. |
| 2009/0106040 A1 | 4/2009 | Jones |
| 2009/0154899 A1 | 6/2009 | Barrett et al. |
| 2009/0210494 A1 | 8/2009 | Fisher et al. |
| 2009/0292814 A1* | 11/2009 | Ting et al. ................... 709/229 |
| 2010/0125803 A1 | 5/2010 | Johnson |
| 2010/0153160 A1 | 6/2010 | Bezemer et al. |
| 2010/0205605 A1 | 8/2010 | Johnson et al. |
| 2010/0257015 A1 | 10/2010 | Molander |
| 2010/0281166 A1* | 11/2010 | Buyya et al. ................. 709/226 |
| 2010/0287281 A1 | 11/2010 | Tirpak |
| 2011/0047273 A1 | 2/2011 | Young, Jr. et al. |
| 2011/0055087 A1 | 3/2011 | Chen-Ritzo et al. |
| 2011/0106557 A1 | 5/2011 | Gazula et al. |
| 2011/0145321 A1 | 6/2011 | Jiang |
| 2011/0235592 A1* | 9/2011 | Hoefel ................... H04L 67/42 370/329 |
| 2011/0270850 A1 | 11/2011 | Wana et al. |
| 2011/0282793 A1 | 11/2011 | Mercuri et al. |

OTHER PUBLICATIONS

Final Office Action dated Feb. 3, 2014 for U.S. Appl. No. 13/599,503.
Office Action issued in U.S. Appl. No. 14/825,882 dated Oct. 19, 2017, pp. 1-21.

* cited by examiner

HIGH PERFORMANCE COMPUTING AS A SERVICE

CROSS-REFERENCE TO RELATED APPLICATIONS

This application is related to commonly assigned U.S. application Ser. No. 12/856,192, entitled "SYSTEM AND METHOD FOR DYNAMIC RESCHEDULING OF MULTIPLE VARYING RESOURCES WITH USER SOCIAL MAPPING", filed concurrently herewith, which is incorporated by reference herein in its entirety.

BACKGROUND

Technical Field

The present invention relates to network services and more particularly to a system and method that provides high performance computing as a service.

Description of the Related Art

High performance computing (HPC) plays an important role in scientific investigations and particularly in scenarios where teraflops are needed to solve computational problems. Typically, such investigations have been limited to a relatively small number of research and commercial institutions due to the large capital cost for setting up and maintaining the underlying cyber infrastructure.

It is difficult to organize HPC resources to form a resource catalog so that resource availability can be visualized for reservation and scheduling. HPC resources are frequently multidimensional including computing nodes as well as three-dimensional locations and communications among nodes which present a very large set of resource combinations. Resource availability of the resource combinations is difficult to visualize for reservation and scheduling (in general, an NP complete problem (the abbreviation NP refers to "nondeterministic polynomial time")).

SUMMARY

A scheduling system and method for high-performance computing (HPC) applications includes a network management component stored in physical memory and executed by a processor. The management component is configured to transform HPC resources into a schedulable resource catalog by transforming multi-dimensional HPC resources into a one dimension versus time resource catalog with a dependent graph structure between resources such that HPC resources are enabled to be provisioned into a service environment with predictable provisioning using the resource catalog. A graphical user interface component is coupled to the network management component and configured to provide scheduling visibility to entities and to enable a plurality of different communication modes for scheduling and communication between entities.

A computer system includes one or more memories, one or more central processing units, and one or more network connections, and further includes a catalog data structure configured to catalog a plurality of available resource types. A dependency data structure is configured to have one or more nodes where each node is associated with at least one of the resources types in the catalog, the dependency data structure also defining dependencies between the resources types. A network interface is configured to permit one or more requests for the resource types, each of the requests being associated with one or more operations. A resource inventory mechanism is associated with one or more of the nodes, each of the requests being associated with one of the resource types such that when a request for a respective resource type is received, the resource inventory mechanism associated with that request operates on the node associated with the requested resource type to resolve all dependencies defined by the dependency data structure related to the resource type and the operation.

A method for scheduling high-performance computing (HPC) applications includes transforming HPC resources into a schedulable resource catalog by transforming multi-dimensional HPC resources into a one dimension versus time resource catalog with a dependent graph structure stored in physical memory between resources such that HPC resources are enabled to be provisioned into a service environment with predictable provisioning using the resource catalog; and providing schedule visibility to entities and enabling a plurality of different communication modes for scheduling and communication between the entities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
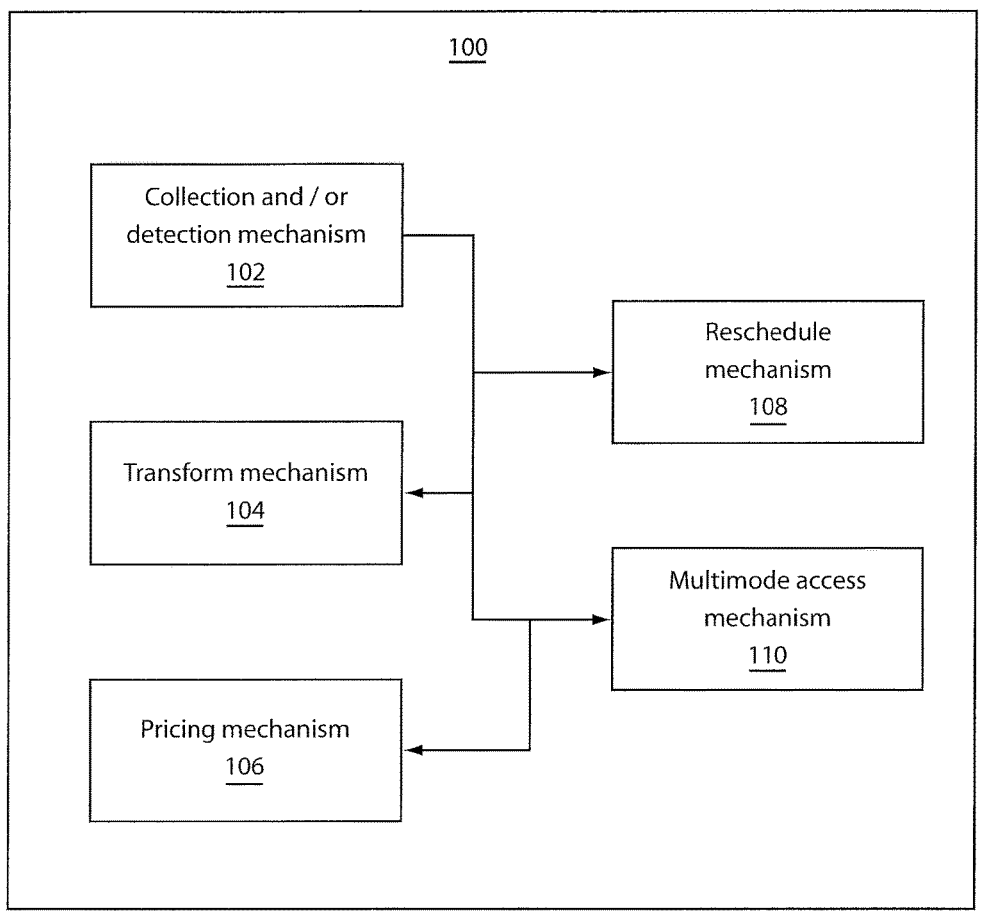
FIG. 1 is a block/flow diagram showing a system/method for scheduling high-performance computing (HPC) resources in accordance with one illustrative embodiment.

In accordance with the present principles, a web based self-service, scalable system architecture and methods are provided to enable scalable applications for a large population of users. In particular, high performance computing (HPC) applications for scientific studies and other applications are conveniently scheduled, and resources are made available to users. This is performed by reducing the dimensionality of the HPC resources. For example, a mechanism is provided to define and transform HPC resources into a set of computable resource catalogs. This makes it easier to know how much of a resource inventory is available for hire or scheduling. Other mechanisms and benefits are also achieved in accordance with the present principles.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A difference between providing HPC as a service and providing mainstream infrastructure as a service is in the computing resources. HPC computing resources include thousands or millions of CPUs working together. One goal is to provide for high performance in scientific computing, like physics, chemistry, or biology; or for large scale data analyses like seismic processing, financial or health care analysis. The hardware is very specialized, and there is a high demand for such computational resources. In addition, the learning curve for using such hardware is in general deep, e.g., needs a large amount of time to learn.

Referring now to the drawings in which like numerals represent the same or similar elements and initially to FIG. 1, a block diagram shows an illustrative system/method 100 for scheduling high performance computing (HPC) services. System 100 includes an architecture that integrates system components, mechanisms and methodologies (which may be implemented in software) to provide a comprehensive network based self-service HPC scheduling service. In block 102, a collection or detection mechanism is provided which may automatically or manually store a collection of resources available for hire or scheduling. The mechanism 102 includes features for discovering resources as well as organizing the information gathered into memory. This may include developing and populating an organizational chart or graph which organizes the available resources.

In block 104, a mechanism to transform HPC resources into a set of efficiently schedulable resource catalogs is provided. Specialized hardware is transformed into a service catalog that is easy to understand, easy to use, and easy to manage. The service catalog is designed to reduce the search space for available resources, while maintaining the optimal speed for a serviceable unit. The mechanism of block 104 transforms multi-dimensional HPC resources into a one-dimension (1D) plus time highly scalable and schedulable resource catalog which employs a dependent graph structure formed in block 102. The mechanism of block 104 enables the provisioning of HPC resources into a self-service environment with predictable provisioning using the transformed 1D+time resource catalog. The HPC resource catalog transforms specialized hardware interconnects into a flexibly manageable service catalog that simplifies workload on-boarding, and enables transparency and variable pricing.

In block 106, a pricing mechanism is provided to efficiently manage HPC resources. The mechanism of block 106 enables predictable resource allocation and reservations of the HPC resources with a pay-as-you-go model or other pricing strategy. The mechanism of block 106 employs dynamic pricing to shape demand for HPC resources and guide users as needed. The dynamic pricing may also be employed to increase profitability, follow other criteria to achieve well-defined goals, shape customer demand for efficient resource utilization while maximizing user satisfaction, etc. A mathematical approach may be employed to minimize the loss of resource demand (preferred pricing in low usage time slots, etc.).

In block 108, a mechanism is provided to support automatic resource re-scheduling by user collaboration. Based on the service catalog, user requests are mapped to items in the catalog, that is, to the physical machine dynamically, so that the computing resources can be used efficiently. Resource requests are dynamically mapped to physical resources. Batch requests are scheduled to minimize system fragmentation. The mechanism of block 108 provides a resource availability view for users for efficient reservations and re-scheduling, e.g., when an application run time is longer (or shorter) than expected. The system 100 automatically creates a collaboration channel and gets related users together for negotiation when a user requests rescheduling.

In block 110, a mechanism simultaneously provides access to HPC resources running scientific workloads for a plurality of modes (e.g., both an interactive mode from a user console and a batch mode from the web). For example, in an interactive mode, users first need to authenticate and login to the resource using an operation system console to access and run the application on that resource. Users themselves need to schedule and reserve the time slot for the resources from the system. In a batch mode, users submit jobs to the system, and the system does the scheduling and assigning of the time slots and resources for the users.

There is preferably a seamless transition between the two modes. For example, when the system first runs a user's application in the batch mode, the user does not have any visibility about the progress of the application (e.g., cannot check if the application runs as designed by looking at some of the memory and flags in the server). This progress status would be very helpful for a user to modify the code or parameters in real time. In this case, there is a need to transition from batch mode to interactive mode where users can have full control of the application's progress.

In another example, when the user first runs its application in interactive mode, the user may discover that he needs to extend the time duration for using the resource. Users will need to submit the resource request to the batch system for rescheduling the resource (e.g., by negotiation with others who own/reserved the requested resources if the system resource is not available).

The mechanism of block 110 can provide a seamless mode transition between both access modes (e.g., interactive and batch). To provide the seamless transition between the interactive mode from a system console and the batch mode from the web, a resource enforcement mechanism (110) is needed. In the console (interactive) mode, if no resource enforcement mechanism in place, users, once logged in, can access all the resources regardless of whether the users have reserved a time slot or not. A resource enforcement mechanism (FIG. 7) will be automatically involved once logged in users try to run an application on the resource. The resource enforcement mechanism (110) checks if the users have reserved a time slot for the given resource. A resource wrapper or structure will be in the system path whenever any application would like to access the resource and run in enforcing resource management. Preferably, the mechanism of block 110 provides a self-service scalable application to enable scalable scientific applications available for a large population of users.

Figure 2:
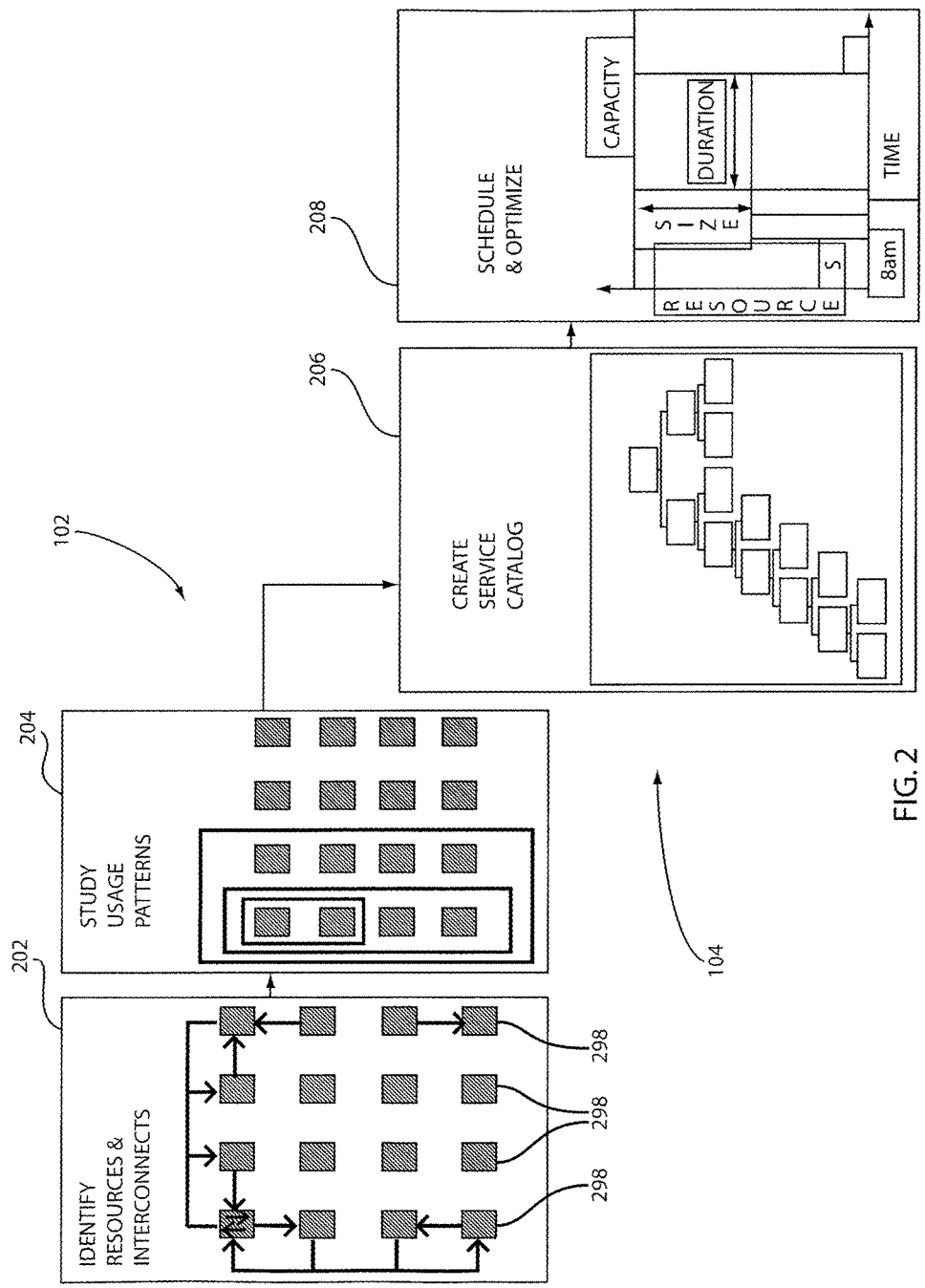
FIG. 2 is a block/flow diagram showing define and transform mechanisms for the system/method for scheduling high-performance computing (HPC) resources in accordance with illustrative embodiments.

Referring to FIG. 2, the mechanisms of blocks 102 and 104 are shown in greater detail to define and transform HPC resources into an efficiently schedulable resource catalog. In block 202, resources and interconnects are identified. These may include nodes with computing power and interconnections therebetween (e.g., X, Y, Z cables, splitters, pass-throughs, etc. between nodes).

Due to the 3-dimensional nature of HPC systems (e.g., torus connections in the Blue Gene™ system of IBM®), the adjacency is not very obvious. The 3D torus structure in Blue Gene/P™ of IBM® provides high-bandwidth nearest-neighbor connectivity while also allowing construction of a network without edges, provides cost-effective interconnects, is scalable and is directly applicable to many scientific and data-intensive problems. The 3D torus in the Blue Gene™ is illustratively described with reference to FIG. 4 below.

In block 204, usage patterns are studied to determine how to best partition or group the resources to address user requests. The partitions may be for any size of a request (no matter whether it is 2000 nodes or 40000 nodes). Partitions are provided that provide optimal speed, performance, availability of resources, etc. In block 206, a service catalog is created. The services catalog may include an augmented binary tree to maintain optimal partition composition. The tree captures partition dependencies and reduces search space. In block 208, a multi-dimensional packing method may be employed to pack multiple dimensions and to conform the scheduling to resource constraints. The method may be employed to schedule both interactive and batch applications. Different dimensions may include, e.g., capacity, resources, time, etc.

Figure 3:
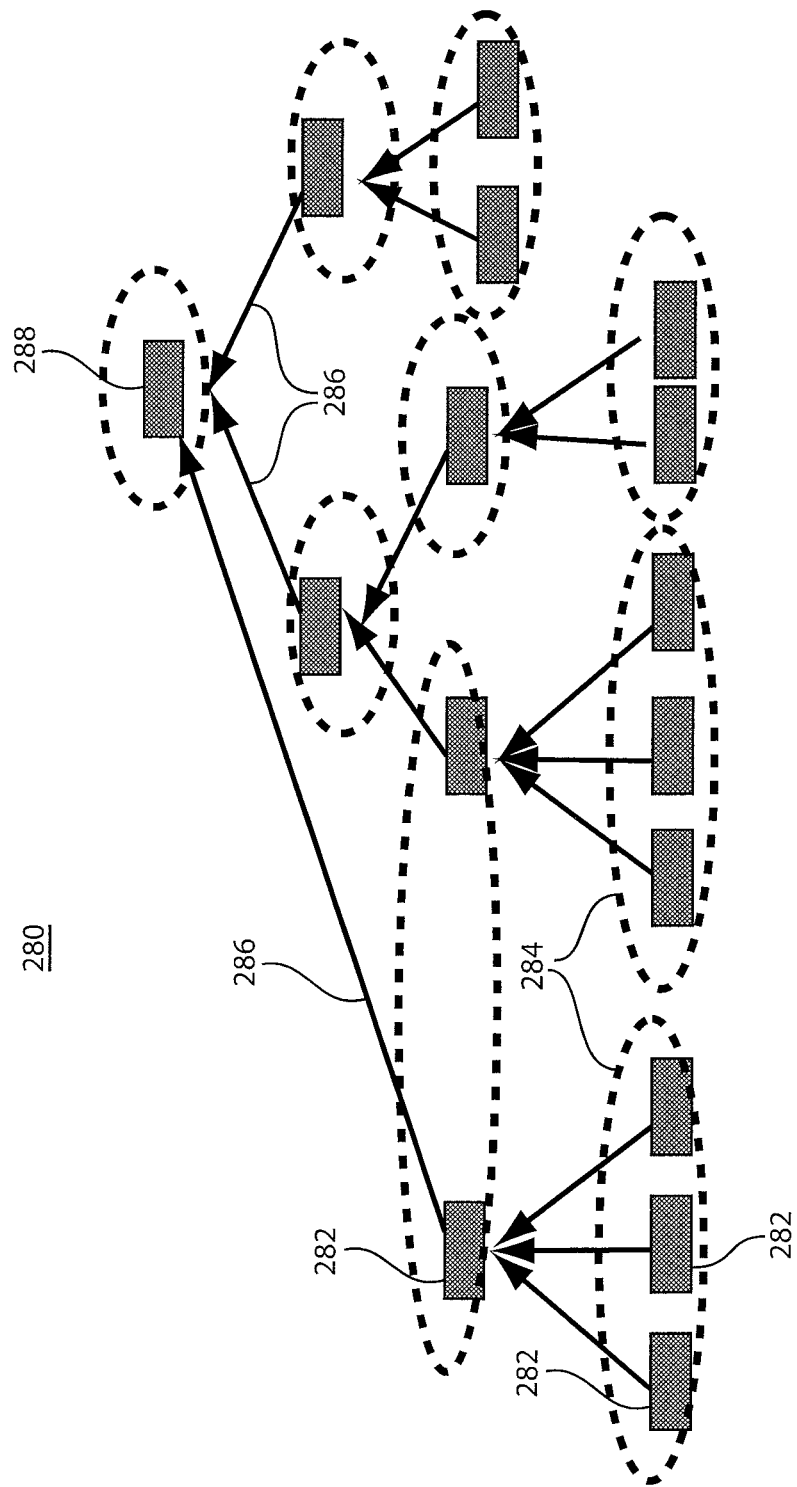
FIG. 3 is a dependency graph for mapping resources in accordance with one embodiment.
Figure 4:
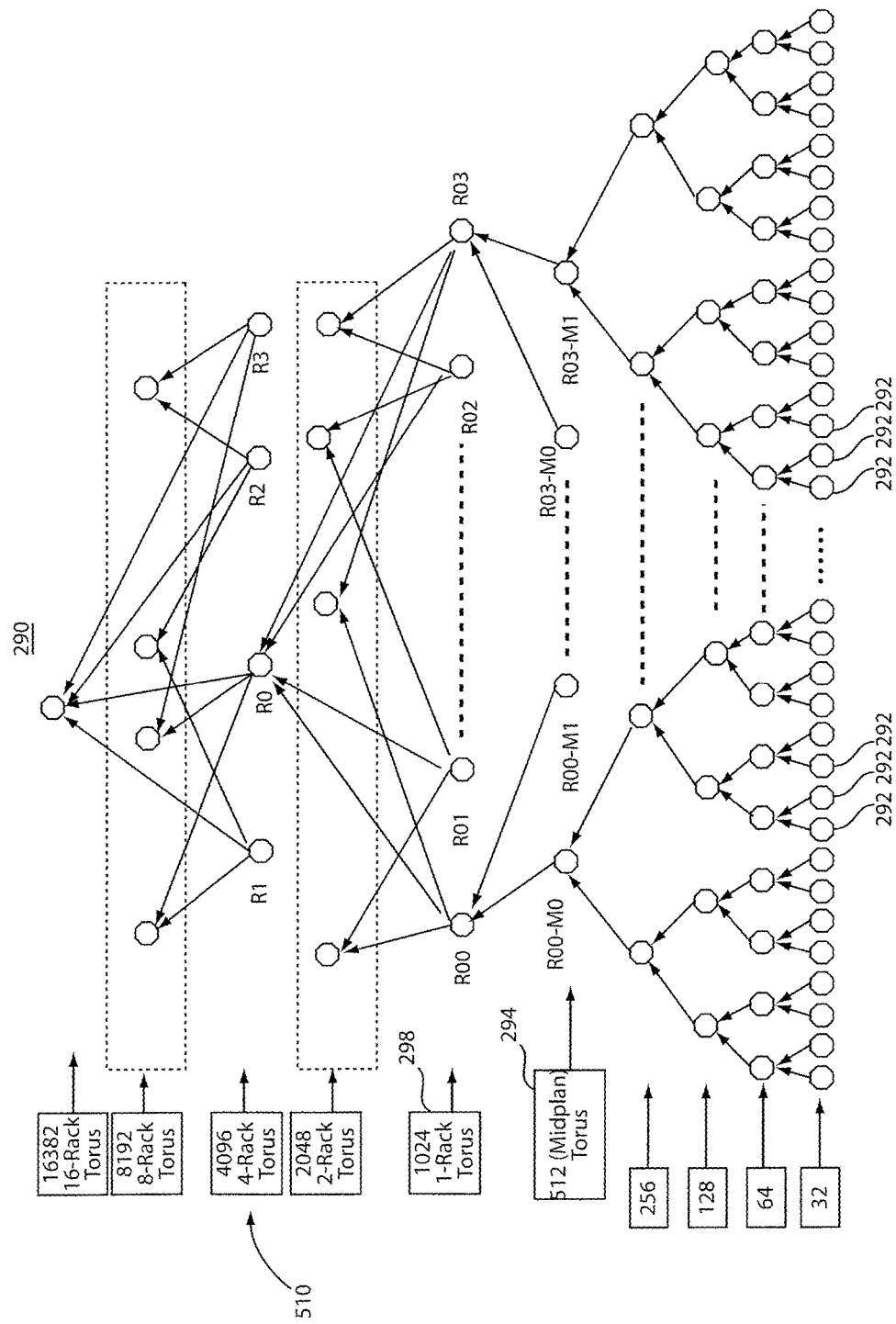
FIG. 4 is an illustrative dependency graph for a more complicated system in accordance with an illustrative embodiment.

In one example, the three-dimensional torus structure shown in FIG. 4 may be employed as an example to provide 3D to 1D resource mapping. The 3D structure presents extreme challenges for a graphical user interface (GUI) (see e.g., GUI 314, FIG. 8) as well as a reservation mechanism (e.g., block 108, FIG. 1). One solution to these challenges is to transform the 3D nature into 1D property to enable the resource commoditization. This may be similar to a packing problem in memory and disk optimizations. The present embodiment makes design decisions which limit resource flexibility for performance and scalability. The present solution provides abstraction to a resource bin packing problem. The 3D resource requirements for HPC applications can be fulfilled by considering a general space and time packing for compute node resource commoditization by a dependent graph data structure depicted in FIG. 3.

Referring to FIG. 3 with continued reference to FIG. 2, a dependent graph structure 280 is illustratively depicted for resources in a HPC system. The resources are divided into different types 284, which include a set of nodes 282. Each node 282 represents a set of 3D resources which are related and dependent on each other by links 286 in the graph 280. The dependent graph 280 has the following properties: Nodes on the same level have no overlapping resources; All the nodes under the same type 284 have a same type of resources in terms of configuration; The parent node has the combined resources of all its leaf or child nodes; A root node 288 represents the entire system resources; Each type circle 284 represents one category in the resource category; and each node 282 represents a configuration that has multi-dimensional resources (CPU, I/O, communication cards, network wiring cables, memory, storage, etc.).

Given the dependent graph properties, we can define a computing method for a resource catalog (see block 206, FIG. 2) that the graph represents. Each dashed circle 284 represents one resource category that can be reserved and scheduled (for example, there are a total of nine resource categories 284 in example tree). The number of the rectangular components or nodes 282 in each dashed circle 284 represents the number of units available for that resource category.

The resource availability computing rule may include the following:
If a node 282 is used, then all its parent nodes traversed across the tree up to the root node will be pruned (i.e., considered to be used);
If a node 282 is used, then all its child nodes are also considered to be used;
With the remaining tree of unused resources, for each category, count all the available units 282 in each dashed circle 284 to obtain the available units for that particular category.

As such, a multi-dimensional resource scheduling will be transformed into a one dimensional plus time with computable resource category in block 208.

A sixteen rack resource (block 202) can be described with a sample dependent graph data structure shown in FIG. 4 where a leaf node (292) consists of a set of various HPC resources (computing nodes, I/O nodes, communication link cards, wiring cables, memory, and storage). Each node 292 forms a type in the corresponding dependent graph data structure. Once a parent node is used, (for example "128 nodes") then all its child nodes ("64 nodes" and "32 nodes") will be marked as used. Also, its dependent nodes in the upper stream will be marked as used, that is, if a "128 node" is used, then its upper stream dependent nodes (256, 512, 1024, 2048, 4096, 8192, and 16382 nodes) will be marked as used. Therefore, a service catalog with an easy tractable HPC resource inventory can be created. Based on this space and time packing provisioning mechanism, the complicated 3D reservation system can be degenerated into a simple 1D (+time) problem for resource reservation as shown in block 208 in FIG. 2.

Referring to FIG. 4, an illustrative three-dimensional infrastructure 290 is depicted to show the complexity of an HPC, such as Blue Gene™. The system 290 includes the following components, chips, compute cards, a compute node card, a rack and a system. A base component is a quad-core chip also referred to as a compute node or chip. One chip is soldered to a small processor card to form a component card. One chip per card, together with memory (DRAM), creates the compute card (one node 292). The amount of DRAM per card is, e.g., 2 GB. The compute cards are plugged into a node card. These are two rows of sixteen compute cards on the node card (planar). From zero to two I/O nodes per compute node card can be added to the compute node card. A rack holds a total of thirty-two compute node cards. A full petaflop system includes seventy two racks. Racks are arranged in rows, for example, seventy two racks can be arranged in nine rows, each row has eight racks. Each full rack has two midplans 294, each midplan 294 has five hundred and twelve compute nodes.

Blue Gene™ has a three-dimensional torus network for general-purpose, point-to-point message passing and multicast operations to nodes. The topology is a three-dimensional torus constructed with point-to-point, serial links between routers embedded within is application specific integrated circuits (ASICs). Each ASIC has six nearest-neighbor connections. The three-dimensional torus network 290 provides interconnection of all compute nodes and communications backbone for computations. The 3D topology beyond a single midplan becomes very complicated and needs configurations of a network of link cards to provide data cable connections. The data cable connections in the system are conventionally described in x-y-z dimensions: the y dimension is the connection between the racks in the same row, the x dimension is the connection between racks of the different rows, and the z dimension is between two midplans within the same rack (see FIG. 2). The 3D connection topology is made even more complicated by using passthrough data and split data cables.

As shown in block 202 of FIG. 2 with continued reference to FIG. 4, sixteen racks 298 are shown in an illustrative 4 by 4 layout. There are 3 dimensional communication links: X, Y, and Z dimensions. The X dimension row is labeled from R0, R1, R2, and R3. Each row consists of 4 columns. Row R0 consists of four column racks in the Y dimension, which are labeled R00, R01, R02, and R03 and shown in FIG. 4. Row R1 consists of four column racks which may be labeled as R10, R11, R12, and R13 (omitted from FIG. 4 for simplicity). Row R2 includes four column racks which may be labeled as R20, R21, R22, and R23 (omitted from FIG. 4 for simplicity). Row R3 consists of four column racks which may be labeled as R30, R31, R32, and R33 (omitted from FIG. 4 for simplicity). Each rack 298 consists of two midplans 294 which include five hundred and twelve computing nodes 292. The midplans 294 are labeled as R00-M0 and R00-M1 for the two R00 midplans shown.

Figure 5:
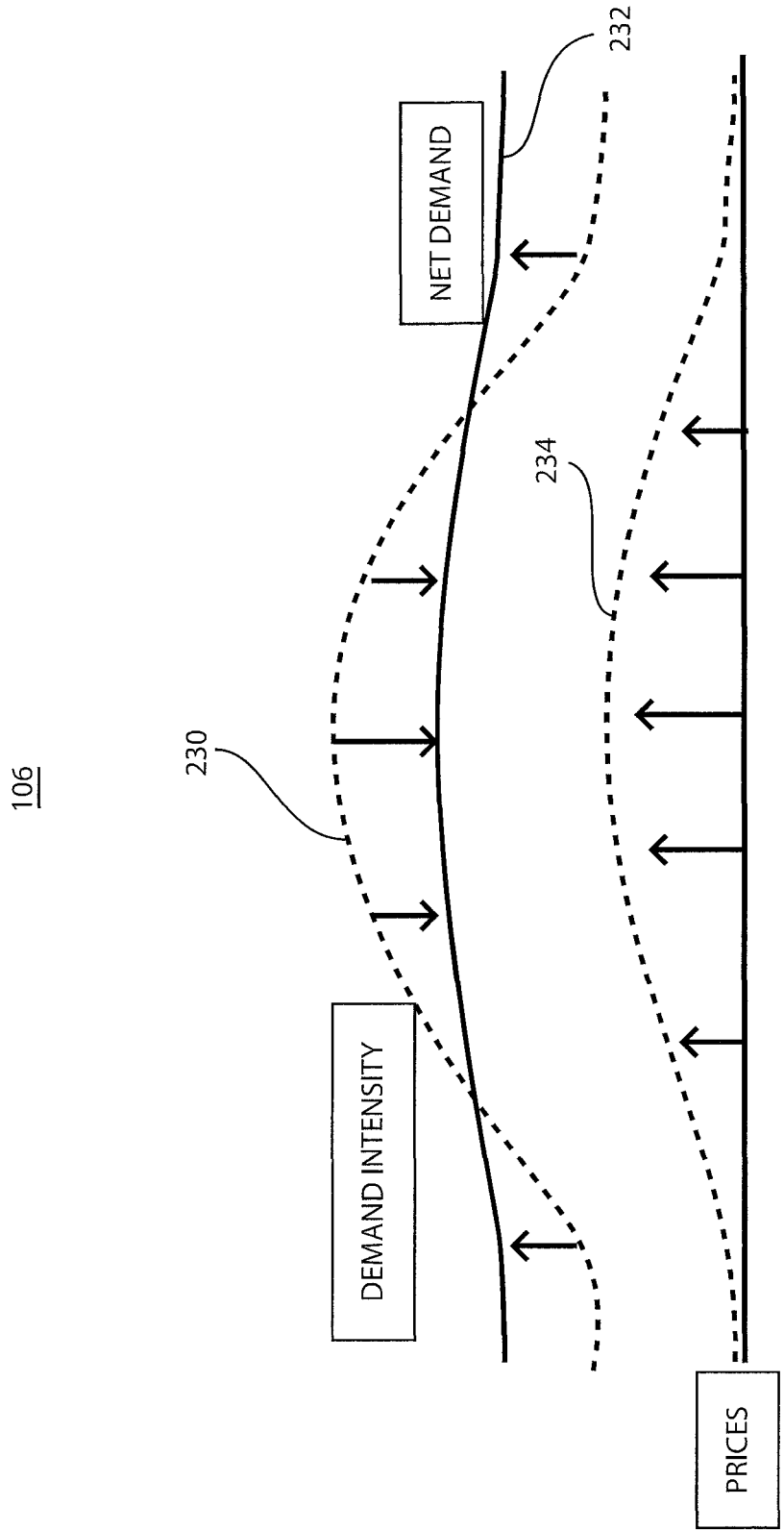
FIG. 5 is a diagram showing a pricing scheme for scheduling high-performance computing (HPC) resources in accordance with demand.

Referring to FIG. 5, the mechanism of block 106 is illustratively described in greater detail. Pricing is one effective method for allocating scarce resources. With dynamic pricing, users that are willing and able to pay a higher price should be allocated the resource. The mechanism of block 106 provides incentives to achieve "manager objectives", for example, profit maximization, customer satisfaction, system performance, etc. If one objective is profit maximization, the mechanism of block 106 looks at demand intensity 230 and net demand 232 to determine pricing 234, e.g., when demand is high; pricing is increased, etc. Other pricing strategies are also contemplated.

Figure 6:
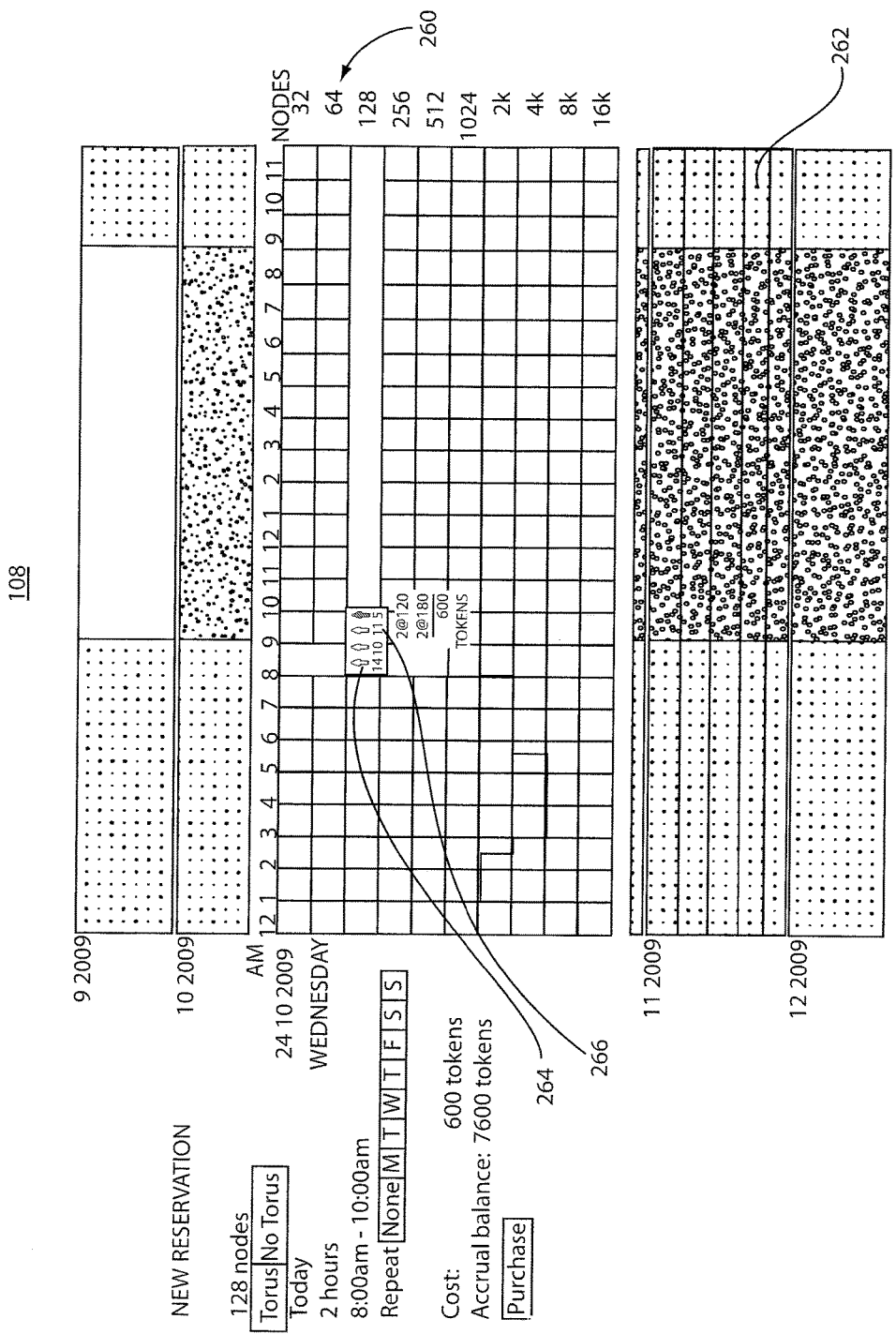
FIG. 6 is a schedule showing one-dimension versus time for scheduling high-performance computing (HPC) resources in accordance with an illustrative embodiment.

Referring to FIG. 6, the mechanism of block 108 to support automatic resource re-scheduling by user collaboration is described in greater detail. In one embodiment, a web-based application 260 is integrated with a HPC service catalog calendaring system console(s), social awareness communication channels and account management.

FIG. 6 shows an illustrative graphical user interface (GUI) 262 for the application. 260. The GUI 262 includes date and time slots for which owners of the resource and scheduled users are placed to allocate the resources. Social maps of users and owners are made accessible through the GUI 262 or by other means by providing clickable areas 264 and 266. Social maps of users/owners from areas 264/266 include information about resources, friends, needs in terms of resources, etc. These maps, accessible through areas 264/266, permit users to join together in groups to negotiate favorable terms for the group. Users may search other user maps to determine user needs and requirements. For example, if a user A would like to log time on a particular resource within two days but only needs the resource for one hour, and if the resource requires a minimum usage of two hours, the user A may search for another user B who needs the resource for only one hour and split the costs. Many other scenarios are contemplated. Some of which will be described herein.

The present embodiments permit socially-aware resource scheduling and enhanced negotiation. The system collects, discovers, and organizes social topology information. Social topology information may include, e.g., a user's organizational structure, a friend list as manual input, mining links generated by users co-editing content, co-attending events, co-enrolling groups, user to user relationships with degrees (the number of steps connecting two users) and weights (closeness estimates). The social topology information can be employed to assist in more effective scheduling. Schedules according to social topology information can be associated with the resource reservations in time and resource dimensions.

User friendliness may be measured by social connectivity scores between current users and existing owners of the resources. This information may be used to select resource owners or communicate with other users to negotiate better terms with the owners. When requested, the system can schedule resources according to user preferences in terms of his/her social connectivity information (e.g., map a request to a same physical location with adjacent time slots as his/her friends). Owner preferences may also be employed.

The social connectivity information may be provided for viewing, e.g., on GUI 260 for a user or owner. Social connectivity links may be visualized (directionally and further perhaps illustrated with a numeric score). A reserved resource may be highlighted with social preferences. Dynamically-created collaboration and negotiation channels can be generated and supported through the application 260 for exchange of information and resources among users. Feedback related to successful exchanges may be provided to incrementally reinforce the effectiveness and applicability of social topology information on resource scheduling.

Figure 7:
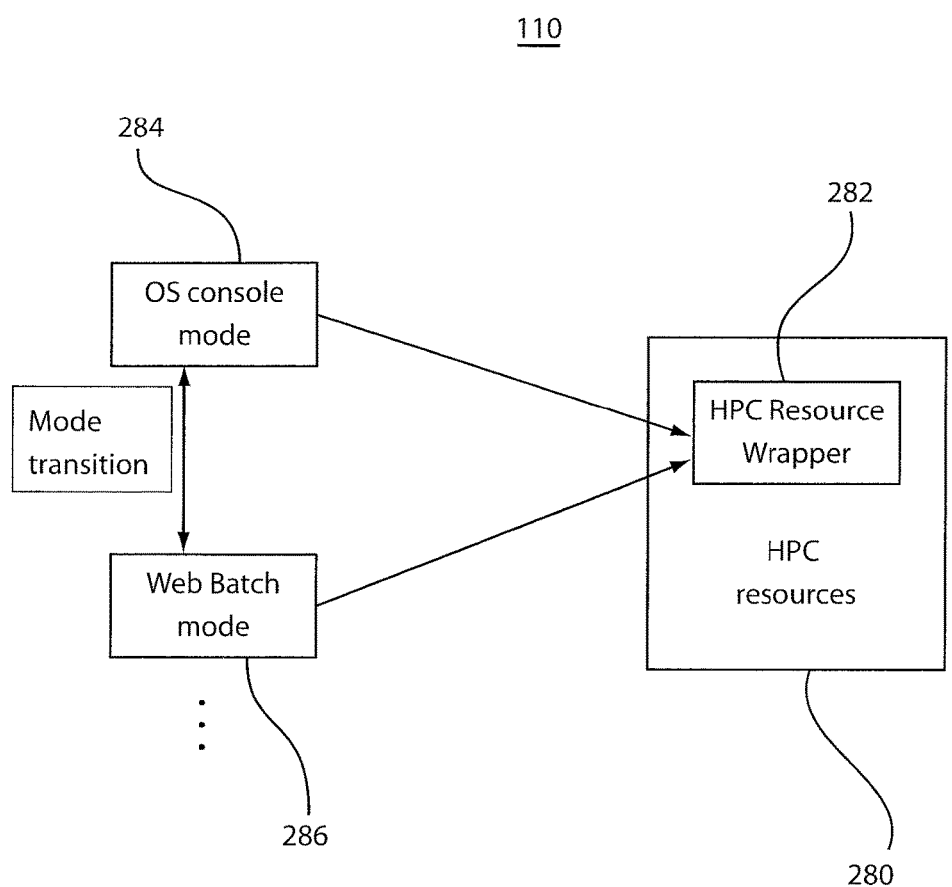
FIG. 7 is a block/flow diagram showing a mechanism for providing access to resources using a plurality of modes in accordance with one illustrative embodiment.

Referring to FIG. 7, the mechanism of block 110 for simultaneously providing access to HPC resources running workloads (e.g., for scientific applications) for both an interactive mode from a user console and a batch mode from the web is described in greater detail. A resource manager application 280 manages resource scheduling and updates the resource catalog and schedule. An HPC wrapper 282 is provided to enforce resource management that will be automatically involved once logged in users try to run the application on the resource. It will be in the system required path and get invoked whenever any application would like to access the resource. Once invoked, the wrapper 282 will check if the users have reserved a time slot and usage right for a given resource and decide whether allow the application to run on the requested resources. The wrapper 282 also provides the system resource and application status to other system components. For example, the wrapper 282 can provide which resources are currently at fault and not usable, which resources are free or busy, and whether the application running on the resource is completed or not. Batch mode and interactive mode can use this information to synchronize their global system resource utilization view and enable the mode transition. The wrapper 282 is configured to generate an interface for both a console or interactive mode 284 and a batch mode 286. The console mode 284 permits an individual user to detect application status details only available from the console mode 284 (e.g., access and interact with the resource schedule to log time). The batch mode 286 can then be used for negotiation, re-scheduling and other interactions with the system. Each of modes 284 and 286 may have a different GUI interface to permit seamless mode transitions between both access modes. In one embodiment, this may be provided by having a single application job ID for both the interactive mode 284 and the batch mode 286.

Figure 8:
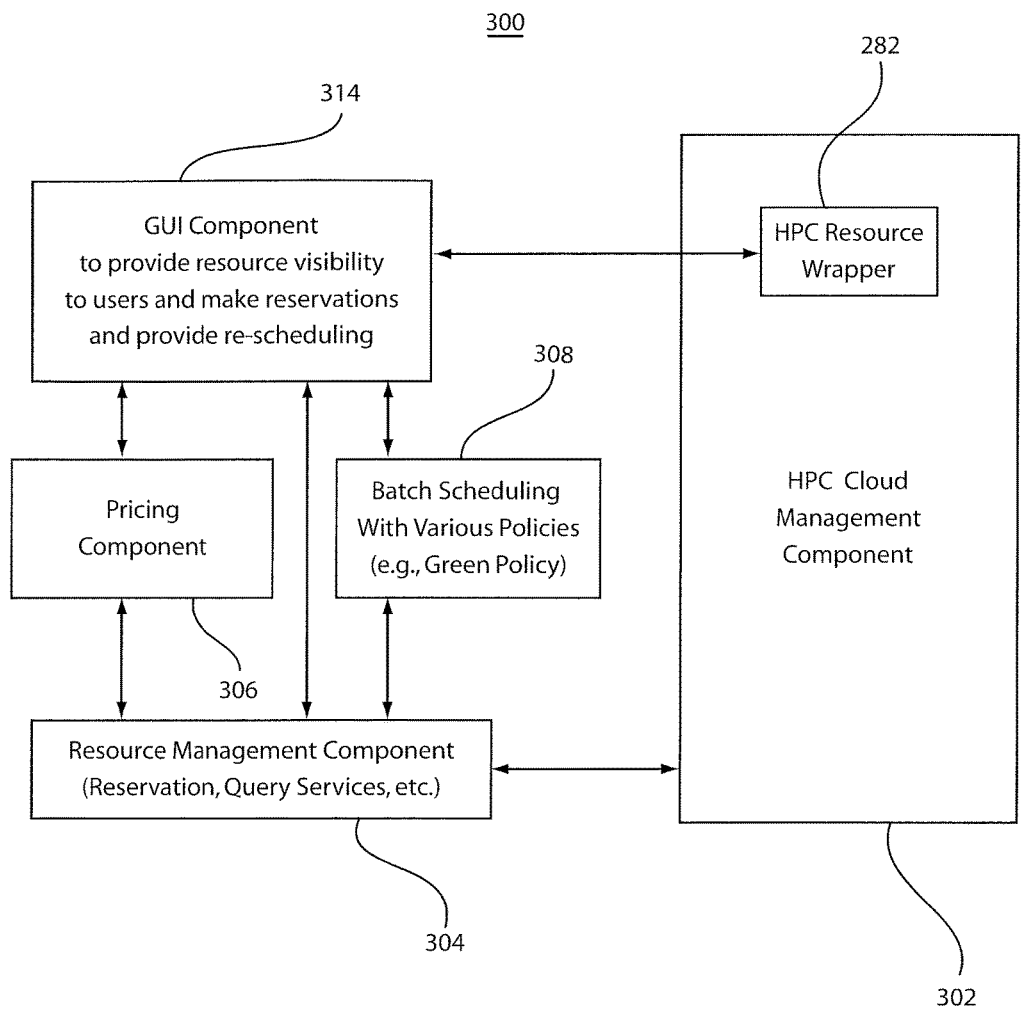
FIG. 8 is a block/flow diagram showing another system/method for scheduling high-performance computing (HPC) resources in accordance with another illustrative embodiment.

Referring to FIG. 8, a block diagram shows an illustrative system/method 300 for scheduling high performance computing (HPC) services in a cloud or network environment in accordance with an alternative embodiment. An HPC network or cloud management component 302 includes the HPC resource wrapper 282 which supports an interactive mode and a batch mode as described.

Component 302 includes a resource transform mechanism that defines and transforms multi-dimensional HPC resources into a 1D (+time) highly scalable and schedulable resource catalog with a dependent graph structure. Component 302 includes a resource provisioning mechanism that transforms HPC resources into a self-service environment with predictable provisioning using a transformed 1D+time resource catalog. A multimode resource access mechanism or the HPC resource wrapper 282 simultaneously supports both an interactive mode from user console and a batch mode from the web. This seamless mode transition also enables users to detect the application status details available only from the console mode and re-schedules from a GUI component 314 in batch mode.

The resource management component 304 coordinates batch scheduling 308 which may rely on different policies, e.g., reduce energy "green" policies (that is, preferably scheduling the jobs to run during the off-peak hours to save the energy consumption), etc. or conditions that affect all schedules, such as power outages, etc. GUI components 314 provides visibility to users and permits interactions between parties (social map transactions, etc.) for reservations, scheduling, re-scheduling, etc.

Component 302 interacts with the GUI component 314. The GUI component 314 provides a personal resource availability view, for efficient reservations and re-scheduling, e.g., if the application run time is greater or less than expected. The GUI component 314 assists in creating collaboration channels to get related users together for negotiation, e.g., when a user requests rescheduling, wants to negotiate better rates, etc.

Component 302 interacts with a resource management component 304. The resource management component 304 includes a resource catalogue mechanism that generates a resource catalogue, maintains a resource partition composition with optimal connection speed, and captures partition dependencies.

Resource management component 304 includes a job packing mechanism that schedules both interactive jobs (with a specific starting time) and batch jobs (with a range of starting times). The resource management component 304 coordinates a dynamic pricing component 306 which dynamically adjusts pricing in accordance with determined criteria, e.g., capacity, demand, etc. The dynamic pricing component 306 includes an allocation mechanism that determines how much time, resources, pricing is to be allocated/distributed to each user periodically to balance supply and demand. The resource pricing component 306 generates price points to offer to users through a visible menu/table, prices varying along dimensions of interest (such as time, utilization levels, etc.) to optimize metrics of interest (revenue, profit, customer satisfaction, etc.). The pricing component includes a learning and parameter adjustment mechanism that determines price and allocation adjustments on a periodic basis based on performance of the system.

The present principles improve user satisfaction of cloud computing environments and the like by simplifying the ability to exploit computing and storage "in the cloud". Current cloud computing vendors only offer access to loosely connected collections of industry-standard virtual machines, and pools of storage. A main concern in high-performance computing is performance. Primary determinants of performance are data locality, locality of reference, communications latency and bandwidth.

By dynamically mapping resource requests to physical resources, scheduling batch requests to minimize system fragmentation, permitting interactions between users/owners, etc., access to HPC resources such as, supercomputers like IBM® Blue Gene™ in a cloud computing or Grid computing model is possible. Such access was previously nonexistent.

The architecture design shown in FIG. 8 may be implemented as a Deep Cloud system to support and streamline complex job scheduling strategies for various HPC applications. Each system component may be loosely coupled with well defined application program interfaces (APIs) to permit $3^{rd}$ party components to plug-in as a service-oriented architecture (SOA) service. The service catalog provided to the GUI component 314 simplifies workload on-boarding, combining transparency and variable pricing. Combining of workload profiling, runtime monitoring and resource allocation maximizes system utilization.

Reservation is the key stone mechanism employed in this architecture for the resource management 304. Users can explicitly use the GUI 314 to make reservations on the resource. Users can submit the jobs without explicitly making reservations. These submitted jobs will be handled by system scheduling agents. The system can define various agents and each agent can schedule the jobs based on its own scheduling policy in block 308. For example, a green policy agent (308) can schedule the jobs to run only during night hours. This policy is particularly important since all the HPC systems demand a large amount of power to run in a data center. A green policy will reduce the peek power requirements of the data center and result in large savings in power cost. Another policy for a scheduling agent is to optimize the resource utilization by scheduling jobs whenever there are unused resources available. The system permits a third party scheduling agent to plug-in to implement their own scheduling policy. All the agents need to be coordinated with each other during scheduling to avoid conflicts.

The architecture 300 provides a centralized resource reservation mechanism or resource management component 304, that is, all agents need to schedule the jobs by reservation. This will not only coordinate all the agents, but also synchronize the explicit user reservation directly from the GUI 314. This type of job scheduling is a macro-based scheduling mechanism as a differentiation with the traditional micro-based job scheduler. A macro-based scheduler relies on the reservation mechanism 304 and is independent of the underlying machine.

The multi-dimensional to 1D space and time packing mechanism simplifies the reservation component. The resource inventory (202) and the services catalog design (206) become manageable since they only need to support the discrete resource value types instead of complicated value types. This also increases the speed performance of the reservation APIs to support a fast interactive GUI 324 for users.

The HPC resource wrapper in block 282 implements the APIs for the resource provisioning services. An image API category is used to register and manage the application images as well as the data needed by the application. An instance API category is used to launch the application, and an availability API category is for querying the resource availability. Note that, the image API category is also used to support the pre-load of the application image and data. This is needed in HPC applications which are characterized by a large amount of application image size and needed application data (e.g., which can be of the order of Peta bytes). It takes time to upload and move such large amounts of data. Traditionally, users waste a lot time manually uploading this data after login. APIs of the present system 300 implement special services to pre-load the data and make it ready and available right before the scheduled reservation time for a user to launch the application as soon as the users login.

In block 306, the workload of the reservation system may be balanced using pricing. The system 300 is built for users to reserve a time slot for the amount of resources needed. A reservation request may be represented by a 3-tuple as (start time, duration, number of compute nodes). Given limited computing resources and a time horizon, a user reservation request can be seen as a rectangle (duration, number of compute nodes) waiting to be inserted into a confined 2D space, where the rectangles may be flexible on the resource allocation (vertical) dimension, but fixed on the time (horizontal) dimension since the start time is specified. For example, when a new request comes, the reservation system 300 will attempt to stack it on top of the current reservations.

Optimization schemes may be applied to minimize system fragmentation through reordering boxes vertically as long as the reservations have not started (e.g., switching vertical positions of boxes). On the time horizon, we rely on the dynamic pricing engine to smooth the demands (e.g., provide incentives for the user reserve mid-day hours to change to mid-night hours). To ensure that users have a disincentive to reserve the system without an actual requirement, the mechanism in block 306 provides a disincentive scheme. For example, price serves as an efficient mechanism to ensure that users willing to pay and with the ability to pay use the resources only when the users need the resources. Further, by pricing resources differently during different blocks of time (for example, peak and off-peak times), the workloads may be balanced better thereby improving customer satisfaction metrics such as "Number of requests met", etc.

A token based scheme may be implemented which works as follows (see e.g., FIG. 6). Computing resources may be purchased in exchange for tokens. Given users requests, the objective is to maximize system performance by (dynamically) adjusting resource prices in tokens per unit of time. We can consider a plurality of pricing schemes, e.g., pre-paid and post-paid. In the pre-paid scheme, each user is allocated a limited number of tokens (in lieu of dollars at the beginning of each period) which can be exchanged for computing time. In the post paid-scheme, users may purchase tokens in real-time (using dollars) to reserve computing resources but there is a cap on the amount of computing resources that can be purchased by a user. The pricing strategies "smooth demand" over the horizon and improve customer satisfaction with respect to static pricing strategies.

Figure 9:
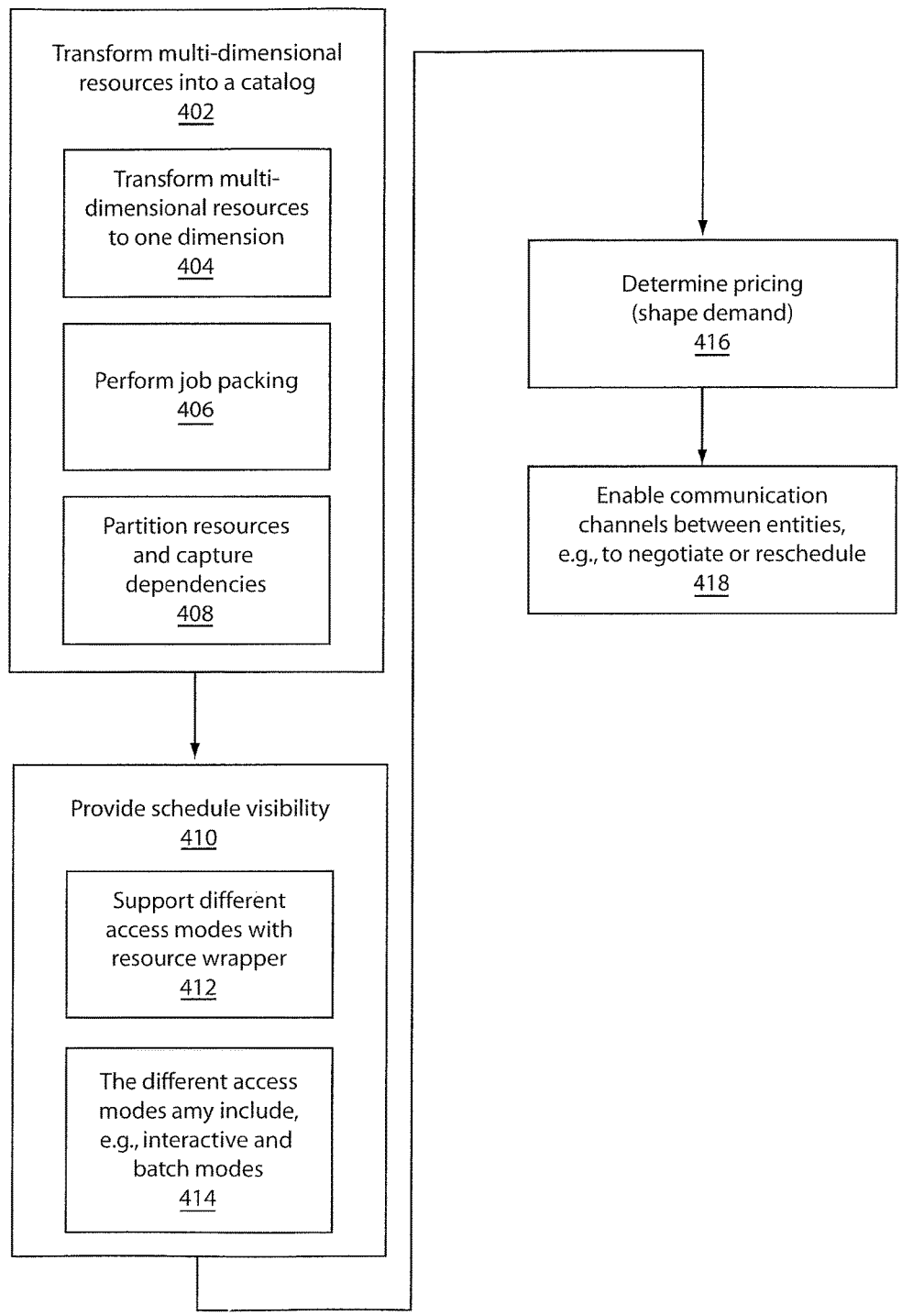
FIG. 9 is a block/flow diagram showing a system/method for scheduling high-performance computing (HPC) resources in accordance with another illustrative embodiment.

Referring to FIG. 9, a system/method for scheduling high-performance computing (HPC) applications is illustratively shown in accordance with another illustrative embodiment. In block 402, HPC resources are transformed into a schedulable resource catalog by transforming multi-dimensional HPC resources into a one dimension versus time resource catalog, in block 404, with a dependent graph structure stored in physical memory between resources such that HPC resources are enabled to be provisioned into a service environment with predictable provisioning using the resource catalog. The one dimension is achieved by reducing multi-dimensional parameters into a single parameter versus time. This may be provided by weighting different properties to achieve a single score that accounts for all parameters.

In block 406, transforming the multi-dimensional HPC resources into a one dimension versus time resource catalog may include job packing the resources to pack the multi-dimensional HPC resources into the one dimension versus time resource catalog. In block 408, the resource catalog is generated by partitioning resources and capturing partition dependencies.

In block 410, schedule visibility is provided to entities. This enables a plurality of different communication modes for scheduling and communication between entities. The plurality of different communication modes may be supported by providing a resource wrapper in block 412. In block 414, the plurality of different communication modes include an interactive mode to enable a user to at least access resource availability and schedules, a batch mode to enable a user to negotiate and reschedule with one or more other entities or other modes. Transitions between these modes are preferably seamless.

In block 416, pricing may be determined by balancing demand against pricing to populate a schedule. In block 418, a communication channel or channels are provided by a network resource management component and configured to enable the communication between the entities.

Figure 10:
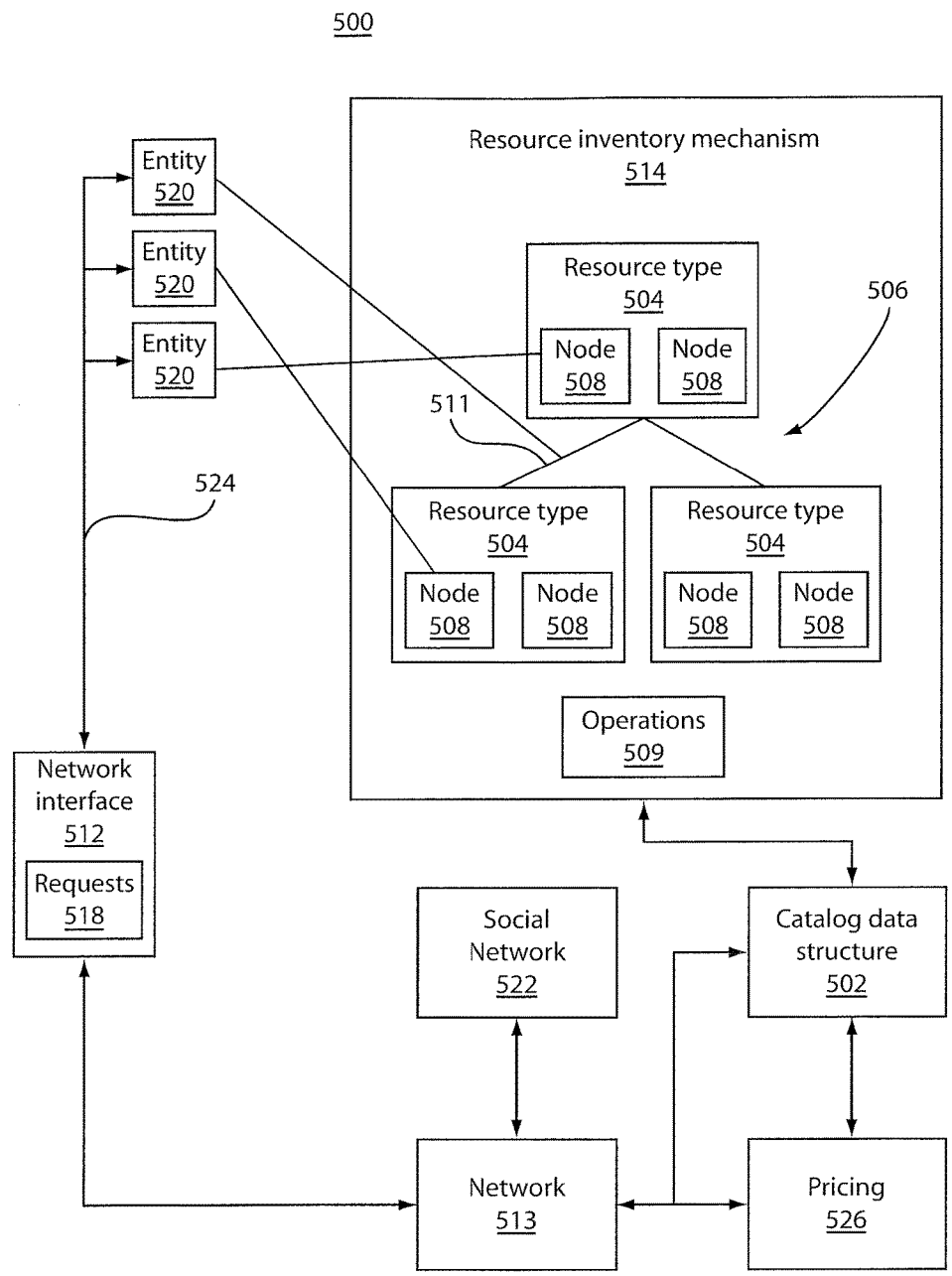
FIG. 10 is a block diagram showing a system for providing high-performance computing (HPC) as a service in accordance with an illustrative embodiment.

Referring to FIG. 10, another system 500 for providing HPC as a service is illustratively depicted. The system 500 preferably includes a computer system comprising one or more memories, one or more central processing units, and one or more network connections. A catalog data structure 502 is configured to catalog a plurality of available resource types 504. A dependency data structure 506 is configured to have one or more nodes 508 where each node is associated with at least one of the resources types 504 in the catalog data structure 502. The dependency data structure 506 also defines dependencies 511 between the resources types.

A network interface (e.g., a GUI) 512 is configured to permit one or more requests for the resource types via a network 513. Each of the requests is associated with one or more operations 509. A resource inventory mechanism 514 is associated with one or more of the nodes 508. Each of the requests 518 is associated with one of the resource types such that when a request for a respective resource type is received, the resource inventory mechanism 514 associated with that request operates on the node 508 associated with the requested resource type 504 to resolve all dependencies defined by the dependency data structure 506 related to the resource type 504 and the operation 509.

The resource inventory mechanism 514 resolves the dependencies by changing respective resource types 504 of nodes 508 to satisfy the request for the respective resource. The resource types may include one or more resource attributes. The operations 509 may include at least one of: reservation, negotiation, cancellation and view. The resource types 504 include one or more of the following: memory size, number of CPU, number of I/Os, communication wiring cables, speed of storage, time slot, communication bandwidth among CPU nodes, geometrically topological structure of among CPU nodes, etc.

The resources may have an entity association with one or more entities 520 and at least two of the entities 520 may be connected in a social network 522. The entity association of the resource type may include, e.g., ownership, control, present use, future allocation, and reservation. At least one of the entity associations is a dependency defined by the dependency data structure 506. The entity association is preferably dynamically changing, and may be one of the resource attributes. A communication channel 524 may be provided to enable two or more of the entities 520 to reallocate one or more of the entity associations. A pricing process/module 526 may be provided that dynamically tracks one or more prices of the resource attributes.

Having described preferred embodiments of a system and method for high performance computing as a service (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A scheduling system for high-performance computing (HPC) applications, comprising:
   a network management component stored in physical memory and executed by a processor, the network management component being configured to:
      optimize HPC resource utilization by transforming multi-dimensional HPC resources into a schedulable one dimension versus time resource catalog that employs a dependency graph structure stored in physical memory including nodes representing respective ones of the multi-dimensional HPC resources and links between corresponding pairs of nodes representing dependencies between the pairs of nodes such that the multi-dimensional HPC resources are provisioned into a service environment with predictable provisioning using the resource catalog, wherein the multi-dimensional HPC resources include three-dimensional locations and interconnects;

generate and support dynamically-created collaboration and negotiation channels for exchange of information and resources among users; and filter catalog entries of the resource catalog based on social topology information providing associations among the users, wherein the filtered catalog entries indicate available multi-dimensional HPC resources to be included in resource negotiations and collaborations, and wherein the resource catalog is generated by partitioning the multi-dimensional HPC resources and capturing partition dependencies, the partitioning providing optimal speed, performance, and availability of the multi-dimensional HPC resources during the provisioning;

a graphical user interface component coupled to the network management component and configured to provide scheduling visibility to the users, the graphical user interface enabling a plurality of different communication modes for scheduling and communication between the users using a computer network; and a resource management component configured to manage provisioning of the multi-dimensional HPC resources into the service environment with optimal partition composition using the resource catalog.

2. The system as recited in claim 1, wherein the resource management component includes a resource wrapper configured to support the plurality of different communication modes and to implement one or more Application Programming Interfaces (APIs) for resource provisioning services, wherein the provisioning services are configured to pre-load application data before a scheduled reservation time to eliminate data access delays for a user at the scheduled reservation time.

3. The system as recited in claim 1, wherein the plurality of different communication modes includes an interactive mode to enable a user to at least access resource availability and schedules.

4. The system as recited in claim 1, wherein the plurality of different communication modes includes a batch mode to enable a user to negotiate and reschedule with one or more other users.

5. The system as recited in claim 1, wherein the resource management component is coupled to the network management component, and wherein the resource management component includes a job packing mechanism configured to job pack the multi-dimensional HPC resources into the resource catalog.

6. The system as recited in claim 5, wherein the resource management component generates the resource catalog by partitioning the multi-dimensional HPC resources and capturing partition dependencies.

7. The system as recited in claim 1, further comprising a price component configured to at least balance demand against pricing to populate a schedule.

8. The system as recited in claim 1, further comprising a communication channel configured to enable the communication between the users.

9. A computer system comprising one or more memories, one or more central processing units, and one or more network connections, and further comprising:

a catalog data structure configured to catalog a plurality of available high performance computing (HPC) resource types into a schedulable one dimension versus time resource catalog that employs a dependency graph structure stored in the one or memories that includes nodes representing respective ones of the HPC resource types and links between corresponding pairs of nodes representing dependencies between the pairs of nodes, wherein the HPC resource types include multi-dimensional HPC resources including three-dimensional locations and interconnects;

a network management component configured to:

generate and support dynamically-created collaboration and negotiation channels for exchange of information and resources among users; and filter catalog entries of the resource catalog based on social topology information providing associations among the users, wherein the filtered catalog entries indicate available HPC resource types to be included in resource negotiations and collaborations, and wherein the resource catalog is generated by partitioning the HPC resource types and capturing partition dependencies, the partitioning providing optimal speed, performance, and availability of the HPC resource types during the provisioning;

a network interface configured to permit one or more requests for the HPC resource types, each of the requests being associated with one or more operations;

a resource inventory mechanism associated with one or more of the nodes, each of the requests being associated with one of the HPC resource types such that when a request for a respective HPC resource type is received, the resource inventory mechanism associated with that request operates on the node associated with the requested HPC resource type to resolve all dependencies defined by the dependency graph structure related to the requested HPC resource type and the operation;

a graphical user interface component coupled to the network management component and configured to provide scheduling visibility to the users, the graphical user interface enabling a plurality of different communication modes for scheduling and communication between the users using a computer network; and a resource management component configured to manage provisioning of the HPC resource types into a service environment with optimal partition composition based on the resource catalog.

10. The system as recited in claim 9, wherein the resource inventory mechanism resolves the dependencies by changing respective resource types of nodes to satisfy the request for the respective resource.

11. The system as recited in claim 9, wherein the HPC resource types include one or more resource attributes.

12. The system as recited in claim 11, further comprising a pricing process that dynamically tracks one or more prices of the resource attributes.

13. The system as recited in claim 9, wherein the operations include at least one of: reservation, negotiation, cancellation and view.

14. The system as recited in claim 9, wherein the social topology information includes information associated with a social network connecting the users.

15. The system as recited in claim 9, wherein the HPC resource types are associated with the entities by: ownership, control, present use, future allocation, and reservation.

16. The system as recited in claim 9, further comprising a communication process to enable two or more of the users to reallocate one or more of the associations among the users.

17. The system as recited in claim 9, wherein at least one of the associations among the users is a dependency defined by the dependency graph structure.

18. A method for scheduling high-performance computing (HPC) applications, comprising:
    optimizing network resource utilization by transforming, by a processor, multi-dimensional HPC resources into a one dimension versus time schedulable resource catalog that employs a dependency graph structure stored in physical memory including nodes representing respective ones of the multi-dimensional HPC resources and links between corresponding pairs of nodes representing dependencies between the pairs of nodes such that the multi-dimensional HPC resources are enabled to be provisioned into a service environment with predictable provisioning using the resource catalog, wherein the multi-dimensional HPC resources include three-dimensional locations and interconnects;
    generating and supporting, by the processor, dynamically-created collaboration and negotiation channels for exchange of information and resources among users;
    filtering, by the processor, catalog entries of the resource catalog based on social topology information providing associations among the users,
        wherein the resource catalog is generated by partitioning the multi-dimensional HPC resources and capturing partition dependencies, the partitioning providing optimal speed, performance, and availability of the multi-dimensional HPC resources during the provisioning, and
        wherein the filtered catalog entries indicate available multi-dimensional HPC resources that are to be included in resource negotiations and collaborations;
    providing, by the processor, schedule visibility to the users and enabling a plurality of different communication modes for scheduling and communication between the users using a computer network; and
    managing, by the processor, provisioning of the multi-dimensional HPC resources into the service environment with optimal partition composition using the resource catalog.

19. The method as recited in claim 18, further comprising supporting the plurality of different communication modes by providing a resource wrapper, the resource wrapper configured to implement one or more Application Programming Interfaces (APIs) for resource provisioning services, wherein the provisioning services are configured to pre-load application data before a scheduled reservation time to eliminate data access delays for a user at the scheduled reservation time.

20. The method as recited in claim 18, wherein the plurality of different communication modes includes an interactive mode to enable a user to at least access resource availability and schedules.

21. The method as recited in claim 18, wherein the plurality of different communication modes includes a batch mode to enable a user to negotiate and reschedule with one or more other users.

22. The method as recited in claim 18, wherein transforming multi-dimensional HPC resources into the resource catalog includes job packing the multi-dimensional HPC resources into the resource catalog.

23. The method as recited in claim 22, wherein the resource catalog is generated by partitioning the multi-dimensional HPC resources and capturing partition dependencies.

24. The method as recited in claim 18, further comprising configuring a communication channel to enable the communication between the users.

25. A non-transitory computer readable storage medium comprising a computer readable program for scheduling high-performance computing (HPC) applications, wherein the computer readable program when executed on a computer causes the computer to perform the steps of:
    optimizing network resource utilization by transforming multi-dimensional HPC resources into a schedulable one dimension versus time resource catalog that employs a dependency graph structure stored in physical memory including nodes representing respective ones of the multi-dimensional HPC resources and links between corresponding pairs of nodes representing dependencies between such that the multi-dimensional HPC resources are provisioned into a service environment with predictable provisioning using the resource catalog, wherein the multi-dimensional HPC resources include three-dimensional locations and interconnects;
    generating and supporting dynamically-created collaboration and negotiation channels for exchange of information and resources among users;
    filtering catalog entries of the resource catalog based on social topology information providing associations among the users,
        wherein the resource catalog is generated by partitioning the multi-dimensional HPC resources and capturing partition dependencies, the partitioning providing optimal speed, performance, and availability of the multi-dimensional HPC resources during the provisioning, and
        wherein the filtered catalog entries indicate available resources that are to be included in resource negotiations and collaborations;
    providing schedule visibility to the users and enabling a plurality of different communication modes for scheduling and communication between the users using a computer network; and
    managing provisioning of the multi-dimensional HPC resources into the service environment with optimal partition composition using the resource catalog.

* * * * *